United States Patent [19]

Castagna

[11] 3,929,932
[45] Dec. 30, 1975

[54] HIGH IMPACT COMPOSITIONS OF POLYETHYLENE AND POLYPROPYLENE BLOCK COPOLYMERS

[75] Inventor: Eugene G. Castagna, Clark, N.J.

[73] Assignee: Dart Industries Inc., Los Angeles, Calif.

[22] Filed: Mar. 26, 1973

[21] Appl. No.: 344,683

[52] U.S. Cl............................ 260/876 B; 260/878 B
[51] Int. Cl.²......................C08L 51/00; C08L 53/00; C08L 23/00
[58] Field of Search...................... 260/878 B, 876 B

[56] References Cited
UNITED STATES PATENTS

| | | | |
|---|---|---|---|
| 3,301,921 | 1/1967 | Short | 260/878 B |
| 3,318,976 | 5/1967 | Short | 260/878 B |
| 3,354,239 | 11/1967 | Short | 260/878 R |
| 3,627,852 | 12/1971 | Aishima et al. | 260/876 B |
| 3,632,674 | 1/1972 | Aishima et al. | 260/876 B |
| 3,647,922 | 3/1972 | Leugering et al. | 260/876 B |
| 3,873,642 | 3/1975 | Jezl | 260/878 B |
| 3,887,640 | 6/1975 | Diaz et al. | 260/876 B |

*Primary Examiner*—Richard B. Turer
*Attorney, Agent, or Firm*—Margareta LeMaire; Fred S. Valles; Bryant W. Brennan

[57] ABSTRACT

Novel polypropylene compositions comprising blends of 85–97wt% block copolymers of propylene and ethylene with 3–15wt% linear polyethylene and a process therefor. The compositions exhibit improved impact and low temperature brittleness properties.

9 Claims, No Drawings

HIGH IMPACT COMPOSITIONS OF POLYETHYLENE AND POLYPROPYLENE BLOCK COPOLYMERS

This invention relates to a synergistic blend of a block copolymer composition of propylene and ethylene with linear polyethylene and a method of preparation thereof.

Polypropylene of high crystallinity has a number of desirable properties that make it a versatile material among current thermoplastic materials. It exhibits high yield strength and rigidity, a high heat distortion temperature and good surface hardness. It is essentially unaffected by most chemicals at or near ambient temperature and is highly resistant to stress cracking. Good scratch and abrasion resistance result in attractive parts. Its impact strength at temperatures above room temperature is moderately good, but polypropylene becomes increasingly brittle at lower temperatures. The ASTM low temperature brittleness point of polypropylene is approximately 70°F, and the polymer becomes extremely brittle at low temperatures, such as at 32°F.

Polypropylene has been used for the manufacture of shaped articles but some of its inherent deficiencies have unfortunately limited its use in many applications for which it would otherwise be well suited. For example, its low impact strength, i.e., high shock sensitivity, at extremely low temperatures is a disadvantage which has precluded its use for many extruded and molded items and in particular for rigid containers and packaging materials. Solid polypropylene is recognized in the plastic industry as possessing great commercial potential because it is superior in several respects to polyethylene, for example, polypropylene has a higher melting point, lower density and greater stiffness than does polyethylene, which latter material is considered unsuitable for injection molding of certain items such as luggage and battery cases.

Very little published data are available on the lowest temperature that different polypropylene compositions will sustain without fracture in standard tests. Some data are available on impact strengths at 0°C and 23°C. While these data show that the impact strength decreases markedly as the temperature is lowered, it does not reveal the critical low temperature brittleness point by standard test or imply whether or not molded items will sustain rough handling at more extreme temperatures of such as at −10°F (−23°C) and below.

Attempts to improve the low temperature impact resistance of polypropylene have been made by addition of rubbery materials such as synthetic rubbers, a polyisobutylene or amorphous ethylene/propylene random copolymers to polypropylene. The improvements have been minor, since they have been accompanied by less stiffness, lower stability and surface dullness. Also, severe difficulties are encountered in preparing intimate blends of the above mentioned compounds, the rubber material being present as chunks or discrete particles in the extruded blend. Polypropylene has also been chemically modified by the addition of a polyethylene block as a means of improving the low temperature brittleness. When such block copolymers or ethylene-propylene random copolymers are blended with polypropylene, the impact resistance of the polypropylene blend is increased, but usually not even to a value as high as that of either of the copolymers per se. A need therefore still exists in the art for a polypropylene composition which retains the high tensile strength and rigidity which is associated with polypropylene, but which has a higher impact resistance at very low temperatures while possessing molecular weight and melt flow in the commercially desired ranges.

It is an object of the present invention to provide a polypropylene composition which has improved low temperature impact resistance as compared to polypropylene as heretofore produced. A further object is to provide a polypropylene composition which improves the low temperature properties while substantially maintaining the other desirable properties. Another object is to provide a process for producing a polypropylene composition having improved low temperature impact resistance. Another object is to provide a process for producing a polypropylene composition which can be molded or processed in the same manner as conventional crystalline polypropylene. A still further object is to provide a process for preparing a polypropylene composition in situ. Other objects will become apparent as the description of the invention proceeds.

In summary, this invention provides a low temperature impact resistant polypropylene composition which is produced by blending 3–15 weight percent polyethylene based on the total polymer present, with the balance of the polymer consisting of a block copolymer of propylene and ethylene. The lower limit of 3 weight percent is the least amount of polyethylene which has a beneficial effect on the properties of the blend. The upper limit of 15 weight percent should not be exceeded to avoid excessive shrinkage and warpage of molded products prepared from the blend. Preferably the upper limit should be not more than 10 weight percent and most preferably the polyethylene content of the blend is between 3 and 5 weight percent.

The polyethylene component should be a particulate linear polyethylene having a melt index in the range of about 0.2 to about 1.0 and more preferably in the range of about 0.5 to about 0.9. It should also have a relatively high density, i.e., a density of at least 0.93. The methods of preparation of such particulate linear polyethylenes are well known in the art; see U.S. Pat. Nos. 2,825,721; 2,912,419 and 2,824,089. It is to be understood that for the purpose of this application linear polyethylene is defined as either the homopolymer of ethylene or as a random copolymer of ethylene and an α-olefin comonomer having from 3–8 carbon atoms. The maximum amount of comonomer should not exceed 5 percent mole.

The block-copolymer useful in this invention is one containing on the average from about 60 to about 95 percent by weight of a polypropylene block, which can contain a small amount of units derived from another α-olefin, e.g., ethylene, and from about 5 to about 40 percent by weight of a postblock of a random copolymer of ethylene and another α-olefin monomer, such as propylene. Preferably the postblock should represent on the average from about 10 to about 25 percent by weight of the total copolymer. The concentration of ethylene derived units in the random copolymer postblock should generally range between about 25 to about 75 mole percent and between 30 and 70 mole percent when propylene is the other α-olefin monomers. The most preferred ethylene content ranges between about 35 and 60 mole percent.

The block copolymer component is suitably prepared by a modification of the technique disclosed in U.S.

Pat. No. 3,702,352, i.e., by a sequential polymerization process wherein a polypropylene preblock, containing from 0 to about 5 mole percent another α-olefin having from 2–8 carbon atoms, e.g., ethylene is formed by polymerization in bulk or in a hydrocarbon diluent to form a slurry, said polymerization being carried out at elevated pressures in the presence of catalytic quantities of a catalyst formed by admixing a subhalide of a metal selected from the group of metals of Groups IVa, Va and VIa of the Periodic Table according to Mendeleef and an aluminum compound containing at least one carbon to metal bond. Suitable operating conditions include pressures in the range from about 150 to 800 psig and temperatures in the range from about 50° to about 250°F. After such polymerization to a solids content of from 10 to 60 percent by weight but preferably from 30 to 50 percent by weight, the preformed polymer slurry is introduced to a low pressure zone such as a cyclone or a bag filter-cyclone combination wherein volatile hydrocarbon constituents are flashed from the polymer to thereby obtain a substantially dry preformed polymer (i.e., containing no more than 5 percent by weight of volatiles) followed by introducing this preformed polymer which still contains active catalyst residues into a continuously agitated vapor phase reaction zone maintained at pressures of from 0 to 100 psig and temperatures of from about 60° to 195°F and introducing a mixture of ethylene and another α-olefin, preferably propylene, into said continuously agitated reaction zone and reacting the mixture in vapor phase to form a block of random-copolymer of ethylene and α-olefin onto the preblock to an extent of from 5 to about 40 percent by weight based on the total weight of the block copolymer. The vapor phase reaction zone contains at least one but preferably two reactors in series each containing agitating means such as paddles on ribbon blades.

Although catalytic materials which have heretofore been indicated as useful include a metal subhalide from the Groups IVa, Va and VIa of the Periodic Table according to Mendeleef, for example, titanium trichloride and the subhalides of vanadium, zirconium, thorium etc., the preferred Group IVa metal is titanium trichloride and more specifically titanium trichloride cocrystallized with aluminum chloride according to the formula in $n\text{TiCl}_3 \cdot \text{AlCl}_3$, where $n$ is a number from 1 to 5. As activators for the titanium trichloride the aluminum compounds containing at least one carbon to metal bond are preferred. Examples of such compounds are trialkyl aluminums wherein the alkyl groups contain from 1 to 10 carbon atoms, but preferably aluminum triethyl or dialkyl aluminum monohalides, wherein the alkyl groups contain from 1 to 10 carbon atoms and the halide is chlorine. The amount of catalyst ranges from 0.01 to 10 weight percent of the liquid monomer or diluent in the prepolymerization zone. The mole ratio of aluminum to titanium ranges from 0.01:1 to 3:1, preferably from 0.05:1 to 0.5:1. Typical catalyst productivities are between 500 to about 900 pounds polymer per pound of catalyst.

A minor amount of a polymer chain regulator such as hydrogen can be used in either the prepolymer reaction or the block-copolymer preparation to modify the melt flow and molecular weight of the polymer. Other known chain regulators may be used instead of hydrogen. Where chain regulators are used to terminate the growth of a polymeric chain of a growing α-olefin polymer, a certain amount of such terminated polymeric chains are believed to be present in the final composition as random copolymer or homopolymer chains, that is they do not form block copolymers and, as a consequence, the block copolymer component of this invention is believed to be a mixture of block copolymers with minor amounts of homo and random copolymers of the particular α-olefins used. The block copolymer is subsequently deashed by any conventional treatment, e.g., by the method of U.S. Pat. No. 3,415,799 for inactivation and removal of catalyst residues and removal of highly amorphous polymer. Such deashing procedures include treatment of the crude polymer with alcohols or mixtures of alcohols and hydrocarbons, such as heptane and an aliphatic alcohol of 1 to 4 carbon atoms, at suitable temperatures followed by separation of the polymer from the volatiles, e.g., by centrifugation or filtration. Residual volatile constituents are then removed from the wet block copolymer in a drying zone containing preferably two dryers arranged in series. Although any dryers can be used, it is especially convenient to use jacketed ribbon blenders equipped with means for passing a sweep gas such as nitrogen therethrough. The drying is carried out at elevated temperatures below the tacky point of the polymer typically in the range from 200°F to about 230°F. The major portion of the solvent is removed in the first dryer, such that the polymer entering the second dryer will typically contain from about 0.5 to about 2 percent by weight of solvent. The final block copolymer exiting the second dryer only contains trace quantities (less than 0.1 percent) of solvent.

The blend of the present invention is conveniently prepared by adding to the block copolymer undergoing drying in the drying zone, preferably in the second dryer, about 3 to 15 percent of the particulate linear polyethylene, based on the total blend of polyethylene and block copolymer. Since the block copolymer in the second dryer is a free-flowing particulate material and remarkably capable of being mixed with linear polyethylene, it is thereby possible to achieve appreciable savings of time and equipment in preparing the blend, the need for additional mixing equipment being obviated. Also, various additives and/or modifiers may be added at this stage. Such additives and modifiers are well known and include oxidation inhibitors, heat stabilizers, slip additives, antistatic additives, colors, pigments, fillers, etc. The final blend is subsequently extruded by conventional equipment into pellets.

It was unexpected to find that the blends of the invention exhibit synergistic effects with respect to various properties such as Izod impact strength and low temperature brittleness properties, while maintaining the desirable properties associated with polypropylene, e.g., moldability and stiffness as determined by tensile modulus. These excellent properties make them especially useful in the packaging field such as packaging of goods which are to be maintained at very low temperatures. Other important uses for the blends are found in the luggage industry for the production of molded lightweight luggage and containers subjected to low temperatures, as might be experienced in a luggage compartment of aircraft flying at high altitudes, and to subsequent rough handling upon unloading. Still another important use for the blends is in the production of battery cases.

The following specific examples illustrate the preparation of the novel blends of this invention.

Properties of the compositions as prepared herein were determined as follows: (a) Melt Flow: expressed in decigrams per minute as measured by ASTM-D-1238 employing a temperature of 230°C, (b) Percent Olefin Incorporation: determined by infrared analysis, (c) Low Temperature Brittleness Temperature °C: as measured by ASTM D-746 except sample bars (0.25 × 1.5 × 0.075 inches) are cut from sheets pressed at 400°F. The sheets are cooled in the press at 25°F per minute. The samples are placed in the Scott Tester with the width parallel to the impact bar. A notch, 0.015 inch deep is cut across the thickness with a razor sharp edge; (d) Notched Izod Impact Strength: expressed in ft-lbs/inch notch as measured by ASTM D-256 at 73°F; (e) Tensile Impact Test: expressed in ft-lbs/inch$^2$ as measured at room temperature, −17.5°C and −29°C by ASTM-D-1822; (f) Tensile Modulus: expressed in lbs/in$^2$ as measured by ASTM D-638.

EXAMPLE I

This example demonstrates the synergistic effects obtained by the blends of this invention. Block copolymers containing about 78 percent by weight of a polypropylene preblock and about 22 percent by weight of a random copolymer post block of ethylene and propylene, wherein the ethylene content of the postblock was about 54 mole percent were prepared according to the procedure set forth below.

Propylene was polymerized in liquid phase in the presence of 0.2 mole percent hydrogen at about 400 psig and 140°F using TiCl$_3$·⅓ AlCl$_3$ catalyst combined with diethyl aluminum chloride (Al/Ti weight ratio of 2.3) in an amount corresponding to 1/lbs TiCl$_3$ per 800 lbs final block copolymer. The residence time was 1.8 hours, the solids content about 21 weight percent and the average production rate was 1780 lbs/hour of polymer. The propylene homopolymer solids were separated in a cyclone - bag filter and then passed continuously through two, serially arranged, rotating ribbon blender reactors wherein the block polymerization took place. A monomer mixture having an ethylene/propylene mole ratio of 0.4 was fed to each of these reactors, which were maintained at 23 psig total pressure and a monomer partial pressure of about 25 psia. The temperature of the first reactor ranged between 145°–170°F and that of the second reactor between 150°–170°F. The total residence time (both reactors) was 2 hours. The copolymer was subsequently deashed with an azeotropic mixture of isopropyl alcohol and heptane containing 0.1% HCl for 2 hours at 175°F and 20 psig for removal of catalyst residues and highly amorphous polymer. The deashed polymer was separated by means of a drum filter, washed with the azeotrope, filtered and subsequently transferred to a first rotating ribbon blender-dryer where the solvent content was reduced to about 1 percent by weight. The resultant free flowing polymer particles were then fed to a second rotating ribbon blender-dryer where the solvent content was reduced to about 500 ppm.

The blends of the present invention were prepared by adding to the second dryer a linear polyethylene powder (homopolymer) having a melt index of 0.8 and a density of 0.960 in an amount corresponding to 4 percent by weight of the resulting blend of polyethylene and block copolymer. The average data from analyses of the blends and their components are shown in Table I below. A comparison of the actual and predicted physical properties provides an excellent demonstration of the synergistic effects obtained with the blends of the invention.

TABLE I

|  | Block Polymer | Polyethylene | Blend Actual | Blend Predicted |
|---|---|---|---|---|
| Melt flow-dg/min | 3.0 | 0.8* | 2.6 |  |
| Notched Izod Impact-ft-lb/in | 3.6 | 4.0 | 6.4 | 3.6 |
| Tensile Impact-ft-lb/in$^2$ |  |  |  |  |
| -room temperature | 200 | 100 | 192 |  |
| −17.5°C | 124 | — | 120 |  |
| −29°C | 98 | — | 104 |  |
| Low Temp. Brittleness −°C | −21 | −118 | −27 | −25 |
| Tensile Modulus-lbs/in$^2$ | 176 | — | 172 |  |

*Melt Index at 190°C

EXAMPLE II

A blend according to the invention and similar to those of Example I was prepared from 5 parts polyethylene of Example I and 95 parts of a block copolymer containing on an average 21 weight percent ethylene-propylene post block. The post block contained about 47 mole percent ethylene derived units. The procedure for making the blends of this Example was similar to that of Example I, the pertinent process conditions being listed hereinafter: Prepolymer production: temperature 150°F, pressure about 400 psig; calculated solids 48.6 percent; TiCl$_3$ productivity 875 lbs polymer/lb, residence time 2.6 hours; production rate 4930 lbs/hr. Copolymer reactors: first stage exit temperature 145°F, second stage exit temperature 135°F, ethylene/propylene mole ratio 0.3, monomer partial pressure 21 psia, total pressure 20 psig, total residence time 2.7 hours. Table II below summarizes the pertinent analytical data of the individual components and the blend.

TABLE II

|  | Copolymer | Polyethylene | Blend Actual | Blend Predicted |
|---|---|---|---|---|
| Melt flow-dg/min | 4.8 | 0.8* | 3.8 |  |
| Izod Impact-ft-lb/in | 2.8 | 4.0 | 10.0 | 2.9 |
| Tensile Impact ft-lb/in$^2$ |  |  |  |  |
| -at room temperature | — | 100 | 201 |  |
| −17.5°C | — | — | 108 |  |
| −29°C | — | — | 103 |  |
| Tensile Modulus - lb/in$^2$ | 156 | — | 151 |  |

*Melt Index at 190°C

EXAMPLE III

This control example which when compared to the previous Examples serves to demonstrate the importance of maintaining the melt index of the polyethylene below 1.0 was carried out exactly as Example II except that the linear polyethylene had a melt index of 1.1 (density of 0.960 and notched Izod impact of 4.0 ft-lb/in). The block copolymer component had a melt-flow of 4.0 and a notched Izod impact of 2.3 ft-lb/in. Analyses of the blend, which had a melt flow of 3.4 dg/min, showed no unexpected improvements in notched Izod impact, the actual and predicted values therefor both being 2.4.

What is claimed is:

1. A binary polypropylene composition having synergistic impact properties which comprises:
   I. from about 3 to about 15 percent by weight of the total composition of a linear polyethylene component having a melt index between about 0.5 and about 0.9 and a density of at least 0.93, and
   II. from about 85 to about 97 percent by weight of the total composition of a block copolymer component containing
      a. from about 60 to about 95 percent by weight of a polypropylene preblock, and
      b. from about 5 to about 40 percent by weight of a postblock of a random copolymer of ethylene and another α-olefin, wherein the content of ethylene derived units in said postblock ranges between about 25 and about 75 mole percent.

2. A polypropylene composition according to claim 1 wherein the linear polyethylene component is a homopolymer of ethylene.

3. A polypropylene composition according to claim 1 wherein the linear polyethylene component is a random copolymer of ethylene and no more than about 5 mole percent of an α-olefin having 3 to 8 carbon atoms.

4. A polypropylene composition according to claim 1 wherein the linear polyethylene component is present in an amount from about 3 to about 10 percent by weight of the total composition.

5. A polypropylene composition according to claim 1, wherein the polypropylene preblock is a polypropylene homopolymer.

6. A polypropylene composition according to claim 1, wherein the polypropylene preblock is a random copolymer of propylene and no more than 5 mole percent of another α-olefin having from 2 to 8 carbon atoms.

7. A polypropylene composition according to claim 1, wherein the random copolymer postblock is a random copolymer of ethylene and propylene and the content of ethylene derived units in said postblock is between about 30 and about 70 mole percent.

8. A polypropylene composition according to claim 7, wherein the content of ethylene derived units in said postblock is between about 35 and about 60 mole percent.

9. A binary polypropylene composition having synergistic impact properties which comprises:
   I. from about 3 to about 10 percent by weight of the total composition of a linear polyethylene homopolymer component having a melt index between about 0.5 and about 0.9 and a density of at least 0.93, and
   II. from about 90 to about 97 percent by weight of the total composition of a block copolymer component containing
      a. from about 75 to about 90 percent by weight of a polypropylene homopolymer preblock, and
      b. from about 10 to about 25 percent by weight of a postblock of a random copolymer of ethylene and propylene, wherein the content of ethylene derived units in said postblock ranges between about 30 and about 70 mole percent.

* * * * *